(12) United States Patent
Rodriquez

(10) Patent No.: US 6,419,193 B1
(45) Date of Patent: Jul. 16, 2002

(54) COLLAPSIBLE WHEELED FLEXIBLE BAG CARRIER

(76) Inventor: Ernest Rodriquez, 14288 E. Los Angeles Ave., Moorpark, CA (US) 93021

( * ) Notice: Subject to any disclaimer, the term of this patent is extended or adjusted under 35 U.S.C. 154(b) by 0 days.

(21) Appl. No.: 09/793,067

(22) Filed: Feb. 26, 2001

(51) Int. Cl.$^7$ ............................................... A63B 55/08
(52) U.S. Cl. ..................... 248/98; 248/101; 248/166; 280/649
(58) Field of Search .................... 248/98, 101, 166; 411/515; 280/1.5, 641, 649; 16/43, 19, 427

(56) References Cited

U.S. PATENT DOCUMENTS

| | | | | |
|---|---|---|---|---|
| 363,533 A | * | 5/1887 | Munger | |
| 1,342,500 A | * | 6/1920 | Finch | |
| 1,899,394 A | * | 2/1933 | Noelting et al. | |
| 2,397,317 A | * | 3/1946 | Hulburt et al. | |
| 2,845,317 A | * | 7/1958 | Orman | |
| 2,967,716 A | * | 1/1961 | Murcott | |
| 3,492,016 A | * | 1/1970 | O'Connor et al. | |
| 3,633,932 A | * | 1/1972 | Holden | |
| 3,722,905 A | * | 3/1973 | Solomon | |
| 4,073,484 A | * | 2/1978 | Beekenkamp | |
| 4,157,801 A | * | 6/1979 | Elmer | |
| 4,354,543 A | * | 10/1982 | Bogner | |
| 4,705,247 A | * | 11/1987 | Delmerico | |
| 4,757,966 A | * | 7/1988 | Harris | |
| 4,759,097 A | * | 7/1988 | Black | |
| 4,934,540 A | * | 6/1990 | Novak | |
| 4,976,406 A | | 12/1990 | Buckley et al. | |
| 5,324,152 A | * | 6/1994 | Anderson, IV | |
| 5,360,189 A | | 11/1994 | Hart | |
| 5,487,551 A | * | 1/1996 | Kennedy | |
| 5,611,123 A | * | 3/1997 | Prizzi | |
| 5,775,649 A | | 7/1998 | O'Leary | |
| 6,027,001 A | * | 2/2000 | Levitan | |
| 6,076,782 A | | 6/2000 | Alderman | |
| 6,092,574 A | * | 7/2000 | Krulik | |
| 6,199,802 B1 | * | 3/2001 | Scheibe, Sr. | |

* cited by examiner

Primary Examiner—Korie Chan
(74) Attorney, Agent, or Firm—Henderson & Sturm LLP

(57) ABSTRACT

A collapsible wheeled flexible bag carrier (10) including a wheeled framework unit (11) having a pair of inverted generally U-shaped support members (20), (20)' pivotally connected to one another and each having a pair of hollow support legs (21), (22), (21'), (22') provided with wheel assemblies (30) and connected on their respective upper ends by cross pieces (23) wherein the lower ends of one pair of support legs (21), (22) are connected to a towing unit (13). In addition, each of the cross pieces (23), (23') is provided with at least one tethered spring loaded clamp member (40) having jaw elements (44) that are further provided with semi-cylindrical extensions that increase the frictional surface area contact between them, the clamp members (40) and a portion of a flexible bag draped over one of the cross pieces (23), (23').

9 Claims, 3 Drawing Sheets

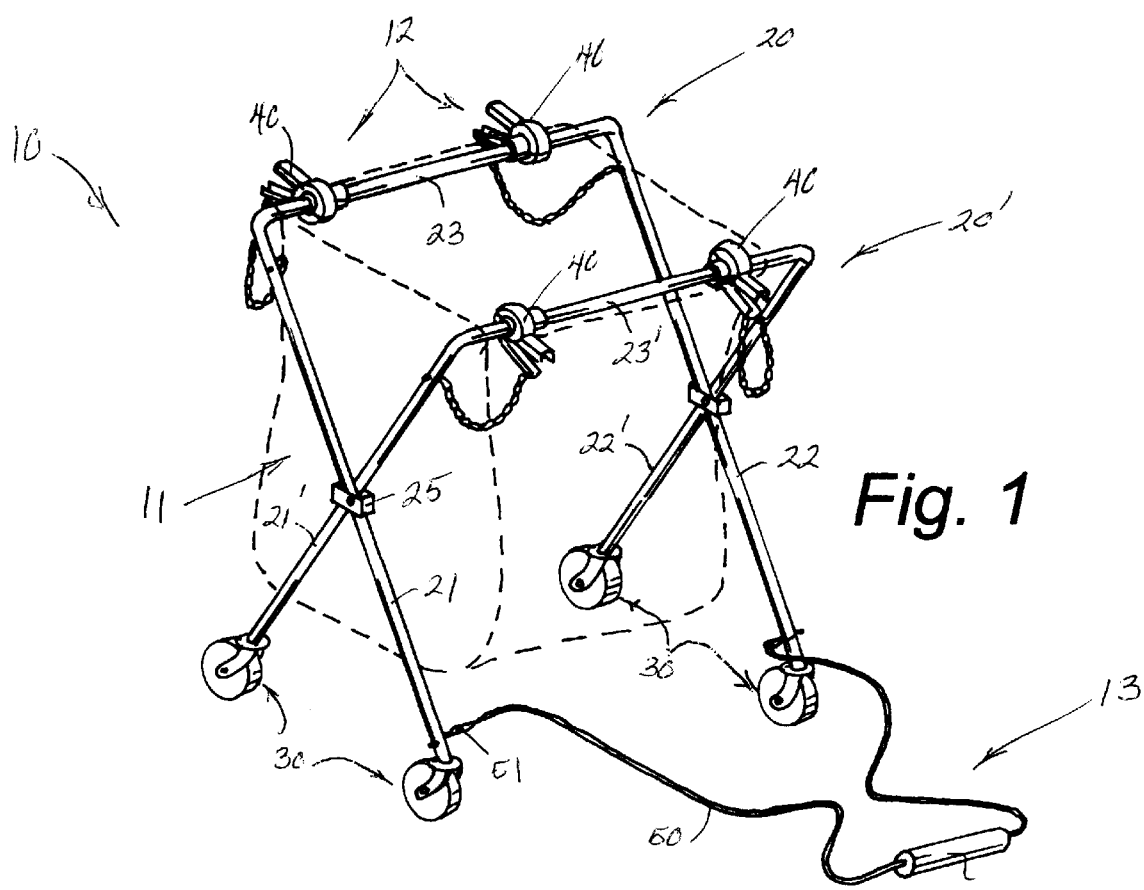
Fig. 1
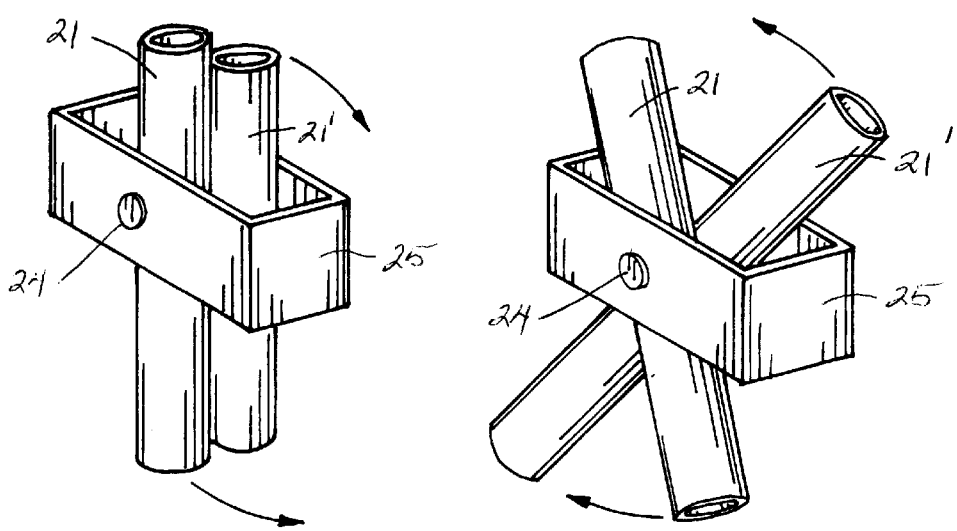
Fig. 2  Fig. 3

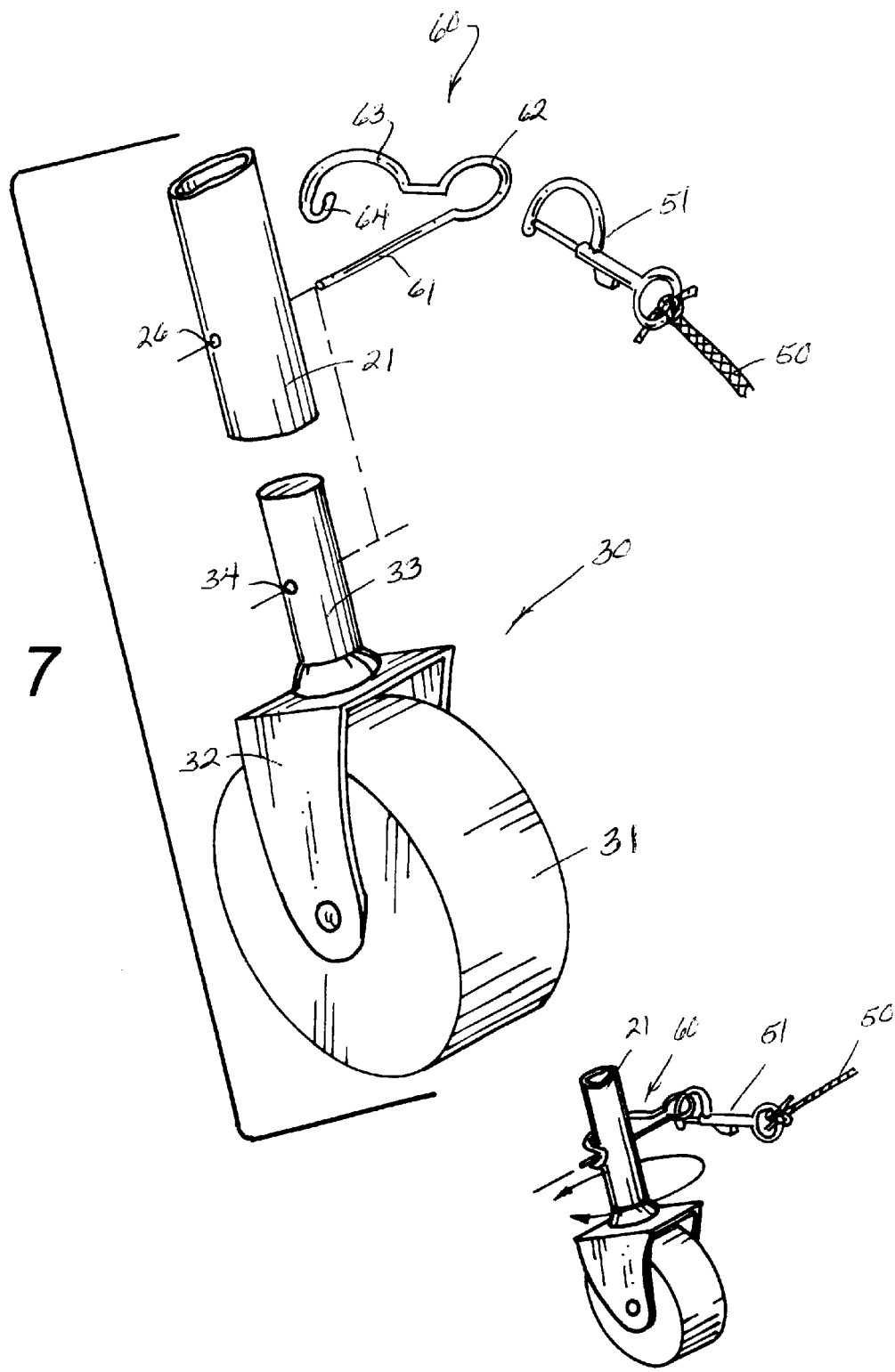

COLLAPSIBLE WHEELED FLEXIBLE BAG CARRIER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of support frameworks for flexible bags in general, and in particular to a collapsible wheeled framework that functions as a flexible bag carrier.

2. Description of Related Art

As can be seen by reference to the following U.S. Pat. Nos. 4,976,406; 5,360,189; 5,775,649 and 6,076,782, the prior art is replete with myriad and diverse flexible bag support frameworks.

While all of the aforementioned prior art constructions are more than adequate for the basic purpose and function for which they have been specifically designed, they are uniformly deficient with respect to their failure to provide a simple, efficient, and practical arrangement wherein a flexible bag may be releasably secured to a collapsible wheeled framework that can be easily transported from one location to another.

As most gardeners, lawn maintenance workers and homeowners having lawns with trees are all too well aware, their routine chores are often compounded by the need to constantly move a flexible bag collection receptacle from one location to another which often results in the tearing or rupturing of the collection receptacle As a consequence of the foregoing situation, there has existed a long standing need for a new and improved flexible bag support and transport device that will releasably engage a flexible bag in a secure manner while being capable of wheeled transport and a collapsed slim profile during storage, and the provision of such an arrangement is the stated objective of the present invention.

BRIEF SUMMARY OF THE INVENTION

Briefly stated, the collapsible wheeled flexible bag carrier that forms the basis of the present invention comprises in general a collapsible wheeled framework unit, a plurality of flexible bag securing units and a towing unit.

As will be explained in greater detail further on in the specification, the wheeled collapsible framework unit includes a pair of inverted generally U-shaped support members each having hollow support legs provided with wheel assemblies and a cross piece that a portion of the open mouth of a flexible bag can be draped over to support the flexible bag on the framework unit in a conventional fashion when the support members are pivoted away from one another.

In addition, the towing unit includes a tow rope member having opposite ends adapted to be secured to the lower end of one of the support members to maintain the support members in a pivoted open orientation during transport; and, the plurality of flexible bag securing units each includes a tethered spring loaded clamp member having a pair of jaw elements each provided with semi-cylindrical extensions that will increase the surface area gripping contact between the individual clamp members, the upper portions of the flexible bag and a selected one of the cross piece on the support members.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the collapsible wheeled flexible bag carrier that forms the basis of the present invention;

FIG. 2 is an isolated detail view of the pivoted support members in their collapsed position;

FIG. 3 is an isolated detail view of the pivoted support members in their extended position;

FIG. 7 is an exploded perspective view of one of the wheel assemblies and a portion of the towing unit; and FIG. 8 is an assembled depiction of the arrangement illustrated in FIG. 7.

DETAILED DESCRIPTION OF THE INVENTION

Figure 4:
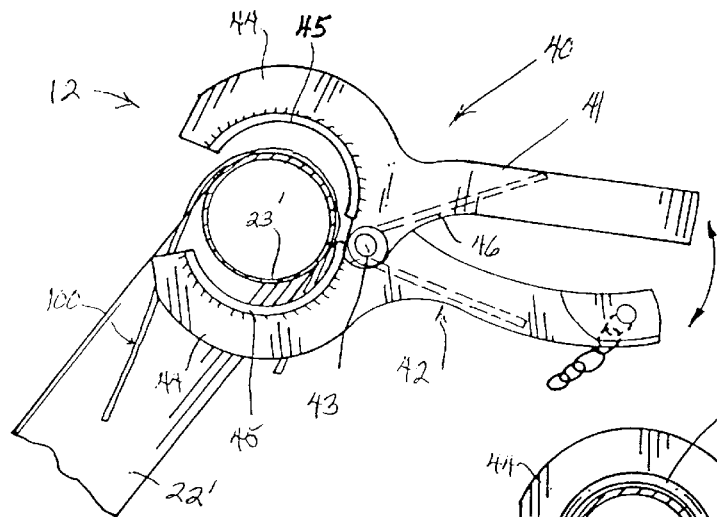
FIG. 4 is a side view of one of the bag securing clamp members in the open position.

As can be seen by reference to the drawings, and in particular to FIG. 1, the collapsible wheeled flexible bag carrier that forms the basis of the present invention is designated generally by the reference number 10. The carrier 10 comprises in general a wheeled framework unit 11, a plurality of bag securing units 12 and a towing unit 13. These units will now be described in seriatim fashion.

As shown in FIG. 1, the wheeled framework unit 11 comprises a pair of generally inverted U-shaped support members 20, 20', each having a pair of hollow support legs 21, 21', 22, 22' that are connected to one another by an upper cross piece 23, 23'.

In addition, as shown in FIGS. 2 and 3, the support members 20, 20' are pivotally secured to one another as at rod 24 proximate the midpoints of the support legs 21, 21' and 22, 22'; and wherein the arc of rotation of the support legs 21, 21', and 22, 22' is limited by a pair of generally rectangular hollow housing elements 25 that are disposed on the opposite sides of the support members 20, 20' wherein the pivot rod 24 operatively connects each housing element 25 to one of the pairs of support legs 21, 21' and 22, 22'.

Furthermore, as shown in FIGS. 1, 7, and 8, the lower ends of each of the hollow support legs 21, 21', 22, 22' are provided with wheel assemblies designated generally as 30 and including a wheel member 31 rotatably suspended within an axle yoke 32 having an upwardly extending post 33 that is dimensioned to be received in the bottom of the hollow support legs 21, 21', 22, 22' wherein each post 33 is provided with a discrete transverse aperture 34 that is align able with pairs of opposed apertures 26 formed in each of the support legs 21, 21', 22, 22' for reasons that will be explained later on in the specification.

Figure 5:
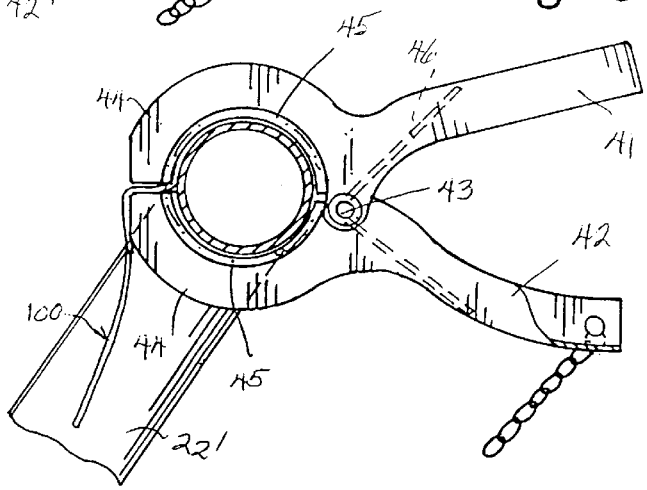
FIG. 5 is a side view of one of the bag securing clamp members in the closed position.
Figure 6:
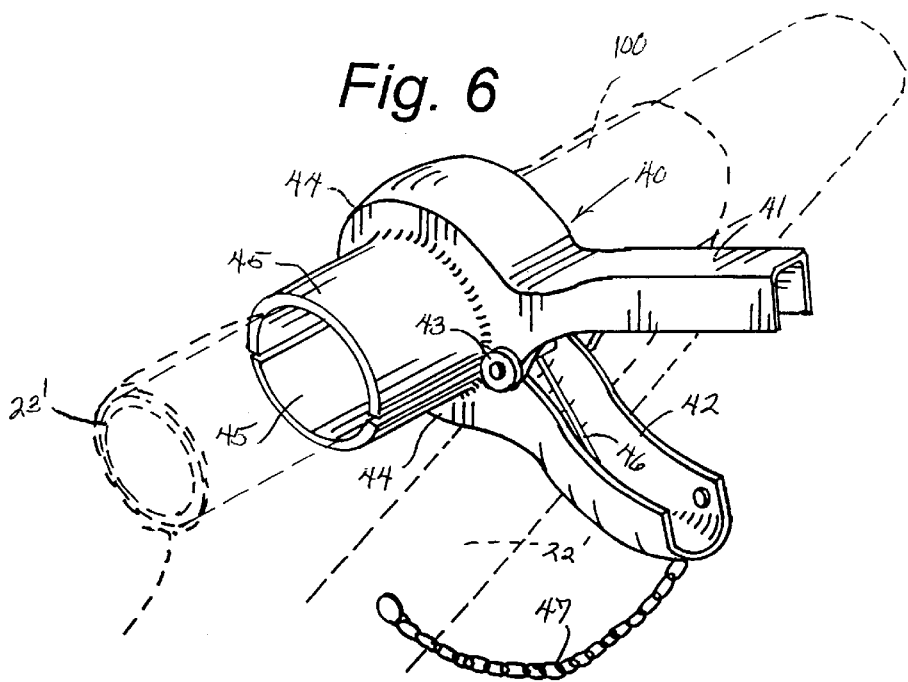
FIG. 6 is a perspective view of one of the bag securing clamp members in the closed position.

Turning now to FIGS. 4 through 6, it can be seen that each of the plurality of bag securing units 12 comprises a spring loaded clamp member 40 having a pair of handle elements 41, 42 pivotally secured to one another as at 43 wherein the in board end of each of the handle elements 41, 42 terminates in a mirror image contoured jaw 44 having a semi-cylindrical extension 45 provided thereon such that the jaws 44 will have an elongated surface area contact with the upper portion of a flexible bag 100 in the act of clamping the bag 100 to the cross piece 23, 23' of the support members 20, 20' as shown in FIG. 1.

Still referring to FIGS. 4 through 6, it can be seen that each of the clamp members 40 is provided with a spring biasing element 46 for biasing the jaw element 44 into a closed position; and one of the handle elements 41, 42 on each clamp member 40 is secured by a short tether 47 to an adjacent support leg 22, 22', etc.

As can best be seen by reference to FIGS. 1, 7 and 8, the towing unit 13 comprises an elongated flexible tow rope member 50 in the form of a length of string, cord, or the like having releasable clasp elements 51 formed on its opposite ends and a handle element 52 disposed proximate the midpoint wherein the clasp elements 51 are adapted to be secured to the lower end of one pair of support legs 21, 22 via a contoured spring wire clip member 60.

As shown in FIG. 7, the wire clip member 60 has a straight leg section 61 that is dimensioned to be received in the transverse aperture 34 in the post element 33 of the wheel assemblies 30 and the opposed apertures 26 in the support legs 21, 21', 22, 22' to attach the wheel assemblies 30 to the support members 20, 20'.

In addition, the wire clip member 60 has a curved intermediate portion 62 that is dimensioned to be engaged by the releasable clasp elements 51 on the tow rope member 50; and a contoured leg section 63 which terminates in a curved hook 64 that is adapted to releasably engage the outboard end of the straight leg section 61 to maintain the wire clip member 60 in engagement with the support legs 21, 21', 22, 22' and the wheel assemblies 30 in a well recognized manner.

It should be further noted at this juncture that the towing unit 13 is attached on the lower end of one of the support members 20, 20' to insure that the act of towing the flexible bag carrier will naturally tend to maintain the support members 20, 20' in their fully open position.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I Claim:

1. A collapsible wheeled flexible carrier comprising:

a wheeled framework unit including a pair of generally inverted U-shaped support members pivotally secured to one another by a pair of pivot rods and having lower portions provided with wheel assemblies; a pair of generally rectangular hollow housing elements with each of said rectangular housings surrounding pivotally secured portions of the support members to limit the pivotal movement between the support members;

wherein each of said pivot rods extends through a respective one of said pair of rectangular housing to support said rectangular housings on said support members;

a plurality of bag securing units each comprising a spring loaded clamp member associated with one of said pair of support members for releasably engaging selected portions of a flexible bag to each of said support members wherein, said plurality of bag securing units is connected to said support members by a like plurality of short tether elements; and wherein, each of said spring loaded clamp members includes handle elements pivotally secured to one another and provided with jaw elements having semi-cylindrical extensions provided thereon; and, a towing unit including a tow rope member whose opposite ends are adapted to be secured to one of said pair of support members.

2. The carrier as in claim 1; wherein, each of said support members includes a pair of hollow support legs having upper ends connected by a crosspiece.

3. The carrier as in claim 2; wherein, each of said wheel assemblies indudes a wheel member rotatably suspended by an axle yoke provided with an upward projecting post that is dimensioned to be received in said hollow support legs.

4. The carrier as in claim 3; wherein, said hollow support legs and said upwardly projecting posts are provided with align able apertures.

5. The carrier as in claim 4 further including a plurality of wire clip members each having a generally straight leg section that is dimensioned to be received in said align able apertures.

6. The carrier as in claim 5; wherein, each of said wire clip members is further provided with a contoured leg section that terminates in a curved hook dimensioned to engage a portion of said straight leg section.

7. The carrier as in claim 6; wherein, each of said wire clip members is also provided with a curved intermediate portion adapted to operatively connected to said tow rope unit.

8. The carrier as in claim 7; wherein the opposite ends of the tow rope member are provided with releasable clasp elements that are adapted to be connected to the curved intermediate portion of said wire clip members.

9. The carrier as in claim 8; wherein the tow rope member has an intermediate portion provided with a handle element.

* * * * *

UNITED STATES PATENT AND TRADEMARK OFFICE
CERTIFICATE OF CORRECTION

PATENT NO.   : 6,419,193 B1
DATED        : July 16, 2002
INVENTOR(S)  : Ernest Rodriquez It is certified that error appears in the above-identified patent and that said Letters Patent is hereby corrected as shown below:

<u>Title page,</u>
Inventor, change spelling to -- Ernest Rodriguez --

<u>Column 4,</u>
Line 34, "indudes" should be -- includes --
Line 39, "align able" should be -- alignable --

Signed and Sealed this

Fourteenth Day of January, 2003

JAMES E. ROGAN
*Director of the United States Patent and Trademark Office*